(12) United States Patent
Singh et al.

(10) Patent No.: US 10,749,441 B1
(45) Date of Patent: Aug. 18, 2020

(54) METHOD AND SYSTEM FOR CONTROLLING A DIRECT CURRENT TO DIRECT CURRENT CONVERTER

(71) Applicant: Deere & Company, Moline, IL (US)

(72) Inventors: Brij N. Singh, West Fargo, ND (US);
Tianjun Fu, West Fargo, ND (US);
Zachary J. Wehri, Fargo, ND (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 16/599,839

(22) Filed: Oct. 11, 2019

(51) Int. Cl.
*H02M 3/335* (2006.01)

(52) U.S. Cl.
CPC ............... *H02M 3/33584* (2013.01)

(58) Field of Classification Search
CPC ......... H02M 3/33584; H02M 3/33523; H02M 3/22; H02M 1/08; H02M 1/36
See application file for complete search history.

(56) References Cited

U.S. PATENT DOCUMENTS

2017/0063251 A1\* 3/2017 Ye .................... H02M 3/33576

\* cited by examiner

*Primary Examiner* — Adolf D Berhane
*Assistant Examiner* — Afework S Demisse

(57) ABSTRACT

In accordance with one embodiment, an observed power transfer is estimated based on input and output voltage measurements associated with an observed power transfer from the primary converter to the secondary converter. An electronic controller or electronic data processor determines a ratio or percentage between the observed power transfer and maximum power transfer. A load curve is selected based on the determined ratio or percentage. The modulation frequency is adjusted or maintained for of the primary converter and the secondary converter consistent with an operation point on the selected load curve, where the operation point minimizes the power loss, power difference, or thermal energy dissipated from the converter.

20 Claims, 10 Drawing Sheets

METHOD AND SYSTEM FOR CONTROLLING A DIRECT CURRENT TO DIRECT CURRENT CONVERTER

FIELD

This disclosure relates to a method and system for controlling a direct-current-to-direct-current converter.

BACKGROUND

In some prior art, a direct-current-to-direct-current converter is used to interface with or to convert direct (DC) bus voltages between a first voltage level and a second voltage level of DC voltage. For example, a primary converter is coupled to a secondary converter via a transformer, where the primary converter is associated with an energy storage device at the first voltage level and where the secondary converter is associated with a load at a second voltage level. The efficiency and heat dissipation of the converter may vary with changes in the load, which tends to require the design of elaborate cooling systems. Accordingly, there is need for method and system for controlling a direct-current to a direct-current converter that generates less thermal energy by adjusting a modulation frequency (e.g., pulse-width modulation frequency) of the primary converter and secondary converter associated with a corresponding load.

SUMMARY

In accordance with one embodiment, a system and method for controlling a direct-current-to-direct-current converter comprises a primary converter coupled to a secondary converter via a transformer. A maximum power transfer is determined, where the maximum power transfer is from the primary converter to the secondary converter (or vice versa for a bi-directional converter configuration). In one configuration, an observed power transfer is estimated based on input and output voltage measurements associated with an observed power transfer from the primary converter to the secondary converter. An electronic controller or electronic data processor determines a ratio or percentage between the observed power transfer and maximum power transfer. The electronic controller or data processor is configured to select a load curve (for efficient operation) of the converter based on the determined ratio or percentage. The electronic controller or data processor adjusts or maintains the modulation frequency of the primary converter and the secondary converter consistent with an operation point on the selected load curve, where the operation point minimizes the power loss, power difference or thermal energy dissipated from the direct-current-to-direct current converter.

DESCRIPTION OF THE PREFERRED EMBODIMENTS

In any of the above referenced drawings of this document, any arrow or line that connects any blocks, components, modules, multiplexers, sensors, switches, diodes, memory, data storage, data processors, electronic components, oscillators, or other electronic or software modules may comprise one or more of the following items: a physical path of electrical signals, a physical path of an electromagnetic signal, a logical path for data, one or more data buses, a circuit board trace, a transmission line; a link, call, communication, or data message between software modules, programs, data, or components; or transmission or reception of data messages, software instructions, modules, subroutines or components.

In one embodiment, the system and method disclosed in this document may comprise a computer-implemented system, method or converter in which one or more data processors process, store, retrieve, and otherwise manipulate data via data buses and one or more data storage devices (e.g., data storage device or memory) as described in this document and the accompanying drawings. As used in this document, "configured to, adapted to, or arranged to" mean that the data processor, converter or controller is programmed with suitable software instructions, software modules, executable code, data libraries, and/or requisite data to execute any referenced functions, mathematical operations, logical operations, calculations, determinations, processes, methods, algorithms, subroutines, or programs that are associated with one or more blocks set forth in any other drawing in this disclosure. Alternately, separately from or cumulatively with the above definition, "configured to, adapted to, or arranged to" can mean that the converter comprises one or more components described herein as software modules, equivalent electronic hardware modules, or both to execute any referenced functions, logic operations, mathematical operations, calculations, determinations, processes, methods, algorithms, subroutine.

Figure 1A:
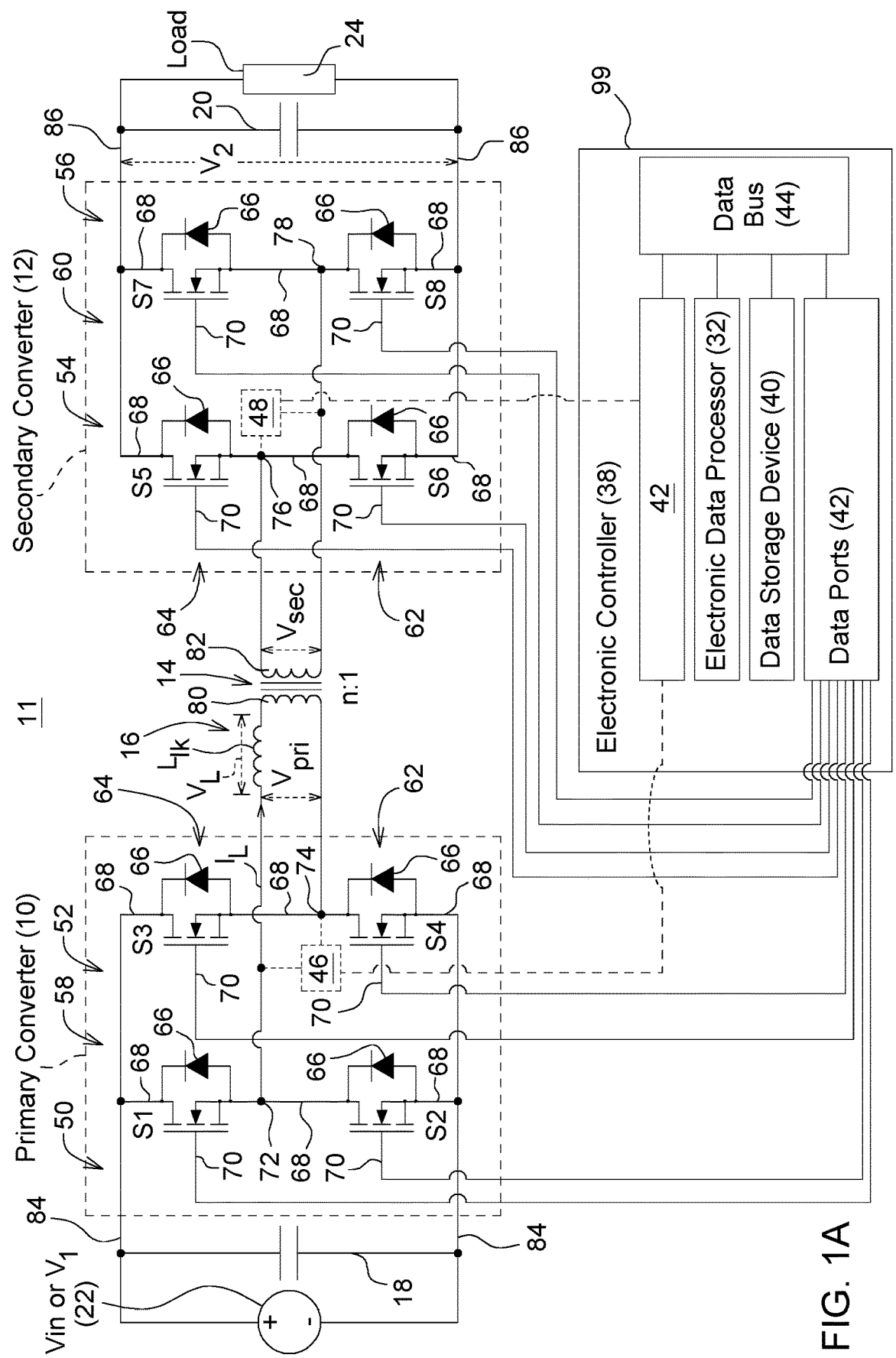
FIG. 1A is a schematic diagram of one embodiment of a direct-current-to-direct-current-converter that comprises a primary full bridge converter coupled to a secondary full bridge converter via a transformer.

In accordance with one embodiment, FIG. 1A illustrates a system of controlling a direct-current (DC) to direct-current (DC) converter for improved thermal efficiency. In FIG. 1A, a primary converter 10 comprises first pair 50 of primary switches and a second pair 52 of primary switches coupled between direct current input terminals 84 of the primary converter 10. A secondary converter 12 comprises a first pair 54 of secondary switches and second pair 56 of secondary switches coupled between direct current output terminals 86 of the secondary converter. A transformer 14 (e.g., isolation transformer) is coupled between the primary converter 10 and the secondary converter 12. A primary winding 80 of the transformer 14 is coupled to output terminals of the first pair 50 and second pair 52 of primary switches and a secondary winding 82 of the transformer 14 is coupled to output terminals of the secondary switches 60. A load 24 (e.g., direct-current load) is arranged for coupling to the direct current output terminals 86; wherein an electronic controller 38 is configured to provide time-synchronized control signals to the control terminals of the primary switches 58 and secondary switches 60 to control the converter 11 or system to operate at a modulation frequency (e.g., pulse width modulation frequency).

In one embodiment, one or more voltage measurement devices (46, 48) are configured to measure an observed input voltage and observed output voltage to determine an operational load ratio or operational load percentage between the observed power transfer and maximum power transfer. Because the measurement devices (46, 48) are optional in some configurations, the measurement devices are illustrated in dashed lines.

In one configuration, an electronic data processor 32 or electronic controller 38 is configured to select a load curve based on the determined operational load ratio or percentage. Further, the electronic data processor 32 or electronic controller 38 is configured to adjust or maintain the modulation frequency (e.g., pulse width modulation (PWM)) of the primary converter 10 and the secondary converter 12 consistent with an operation point on the selected load curve, where the operation point minimizes the power loss or thermal energy dissipated from the direct-current-to-direct current converter 11.

FIG. 1A is a schematic diagram of one embodiment of a direct-current-to-direct-current converter 11 (DC-to-DC converter) that comprises a primary full bridge 10 coupled to a secondary full bridge 12 via a transformer 14. A primary full bridge 10 comprises first pair 50 of primary switches and a second pair 52 of primary switches. The first pair 50 of primary switches is coupled between direct current (DC) primary terminals 84 (e.g., input terminals) of the primary full bridge 10; the second pair 52 of primary switches 58 is coupled between DC primary terminals 84 (e.g., input terminals) of the primary full bridge 10. The first pair 52 and second pair 58 of primary switches may be referred to as an H-bridge.

In one embodiment, the DC-to-DC converter 11 comprises a single phase, dual-active bridge DC-to-DC converter with DC primary terminals 84 (e.g., DC input terminals) at the primary full bridge 10 and DC secondary terminals 86 (e.g., DC output terminals) at the secondary full bridge 12, where the DC-to-DC converter may operate unidirectionally or bidirectionally (e.g., to transfer electrical power or energy from the input to the output of the converter 11, or vice versa).

Each pair of primary switches 58 comprises a low-side switch 62 and a high-side switch 64. Similarly, each pair of secondary switches 60 comprises a low-side switch 62 and a high-side switch 64. Each switch (58, 60) has switched terminals 68 that are controlled by a control terminal 70. For example, if the switch is a field effect transistor, such as a metal oxide semiconductor field effect transistor (MOSFET) (e.g., Silicon Carbide MOSFET), the switched terminals 68 comprise a source and drain terminal and the control terminal 70 comprises a gate terminal. In one configuration, for each pair of primary switches 58, the switched terminals 68 of the low-side switch 62 are coupled in series to the switched terminals 68 of the high-side switch 64 between the DC primary terminals 84. As illustrated in FIG. 1A, each switch has a protective diode 66 coupled in parallel to the switched terminals 68 of the respective switch. In one embodiment, the switches (58, 60) may comprise silicon carbide field effect transistors or other wide-band-gap semiconductor devices.

In the primary full bridge 10, the switched terminals 68 of the first pair 50 of low-side switch 62 and the high-side switch 64 are coupled together at a first node 72 or first junction associated with a primary alternating current signal. In the primary full bridge 10, the switched terminals 68 of the second pair 52 of low-side switch 62 and the high-side switch 64 are coupled together at a second node 74 or second junction associated with the primary alternating current signal.

A secondary full bridge 12 comprises a third pair 54 of switches (e.g., secondary switches 60) and a fourth pair 56 of switches (e.g., secondary switches 60) coupled between DC secondary terminals 86 (e.g., output terminals) of the secondary full bridge 12. The third pair 54 of switches (e.g., secondary switches 60) is coupled between direct current secondary terminals (e.g., output terminals) of the secondary full bridge 12; the fourth pair 56 of switches (e.g., secondary switches 60) is coupled between DC secondary terminals 86 (e.g., output terminals) of the secondary full bridge 12.

Each pair of secondary switches 60 comprises a low-side switch 62 and a high side switch 64. Each secondary switch 60 has switched terminals 68 that are controlled by a control terminal 70. For example, if the switch is a field effect transistor, such as a metal oxide semiconductor field effect transistor (MOSFET) (e.g., silicon carbide MOSFET devices), the switched terminals 68 comprise a source and drain terminal and the control terminal 70 comprises a gate terminal. As illustrated in FIG. 1A, each secondary switch 60 has a protective diode 66 coupled in parallel to the switched terminals 68 of the respective switch.

In the DC-to-DC converter 11 in one illustrative configuration, each diode 66 facilitates current dissipation associated with the respective switch (58, 60), to which the diode 66 is coupled in parallel, to reduce transient voltages across the switch (e.g., during a prior turn-off, prior deactivation or prior dead-time of the switch in preparation) for the next turning on of the switch, or next activating of the switch (58, 60). In one embodiment, the protective diodes 66 may be composed gallium nitride diodes or other semiconductor materials.

In the secondary full bridge 12, the switched terminals 68 of the third pair 54 of low-side switch 62 and the high-side switch 64 are coupled together at a third node 76 or third junction associated with a secondary alternating current signal. In the secondary full bridge 12, the switched terminals 68 of the fourth pair 56 of low-side switch 62 and the high-side switch 64 are coupled together at a fourth node 78 or fourth junction associated with the secondary alternating current signal.

In one embodiment, a transformer 14 is coupled between the primary full bridge 10 and the secondary full bridge 12. For example, a primary winding 80 of the transformer 14 is coupled to a first node 72 (e.g., first output terminal) of the first pair 50 and the second node 74 (e.g., second output terminal) of second pair 52 of primary switches 58. Similarly, a secondary winding 82 of the transformer 14 is coupled to a third node 76 (e.g., third output terminal) of the third pair 54 and a fourth node 78 (e.g., fourth output terminal) of the fourth pair 56 of switches (e.g., secondary switches 60).

The transformer 14 has at least one primary winding 80 and at least one secondary winding 82, where a transformer 14 ratio (n) represents a voltage ratio between the primary terminals and the secondary terminals, or between the primary winding and the secondary winding. For example, the primary winding 80 ratio may represent the number of relative turns (n) of the primary winding 80 to the secondary winding 82. The voltage ratio or winding ratio (turn ratio) may depend upon the winding configuration, the conductor configuration, and the configuration of any core, such as ferromagnetic core, a ferrite core, or an iron core.

In one embodiment, an inductor or variable inductor 16 is coupled in series with the primary winding 80 of the transformer. In an alternate embodiment, the variable inductor is associated with a set of discrete inductors that can be connected, via a set of switches, in series, in a parallel, or both, to achieve an adjustable aggregate inductance. For example, the controller 38 or data processor 32 can control or adjust the variable inductor, or its associated switches, to tune the transformer 14 for the target modulation frequency (e.g., of a pulse width modulation (PWM) signal) to minimize power loss, power difference or thermal dissipation of the converter 11.

An energy source 22 (e.g., battery, capacitor, or generator output) is coupled to the direct current (DC) primary terminals 84 (e.g., input terminals). A load 24 (e.g., active or passive load) is configured to be coupled to the direct current (DC) secondary terminals 86 (e.g., output terminals). However, the DC-to-DC converter 11 that comprises the primary full bridge 10, the secondary full bridge 12 and the transformer 14 can operate bi-directionally, such as where the electrical energy is transferred in either direction between the DC primary terminals 84 and the DC secondary terminals 86. In one direction, the energy source 22 at the DC primary terminals 84 can power a load 24 at the DC secondary terminals 86. However, in the opposite direction, the load 24 at the DC secondary terminals 86 can provide excess or transient energy to the DC primary terminals 84 to charge the energy source 22. As illustrated, a capacitor, such as a primary capacitor 18 is placed across the DC primary terminals 84 and a secondary capacitor 20 is placed across the DC secondary terminals 86, where the primary capacitor 18 and the secondary capacitor 20 are used for filtering (e.g., to reduce noise, such as voltage ripple in the DC voltage).

In certain embodiments, the DC primary terminals 84 are configured to operate at a different voltage level than the DC secondary terminals 86. In other embodiments, the DC primary terminals 84, the DC secondary voltage levels can have variable voltage levels that can fluctuate with the load 24 or operating conditions on a dynamic basis for each time interval (e.g., sampling time of DC voltage observed at the DC primary input and DC secondary output terminals of the converter). For example, the DC primary terminals 84 operate at a higher voltage level or higher voltage range (e.g., approximately 400 VDC to approximately 800 VDC) than a lower voltage level or lower voltage range (e.g., approximately 12 VDC to approximately 400 VDC) the DC secondary terminals 86. Accordingly, the electronic assembly or DC-to-DC converter 11 supports a vehicle with different DC bus levels that are isolated from each other because the transformer blocks DC energy from passing through between transformer primary and transformer secondary.

In one embodiment, an electronic data processor 32, such as an electronic controller 38, is configured to provide time-synchronized control signals to the control terminals 70 of the primary switches 58 and secondary switches 60 to control the converter 11 to operate efficiently in a first control mode 26, a second control mode 28, or a third control mode 30 (in FIG. 7), wherein the first control mode 26 comprises a phase-shift mode, the second control mode 28 comprises a triangular waveform control mode and wherein the third control mode 30 comprises a trapezoidal waveform control mode.

In one embodiment, an electronic controller 38 comprises an electronic data processor 32, a data storage device 40, and one or more data ports 42 coupled to or in communication with a data bus 44. The electronic data processor 32, the data storage device 40, and one or more data ports 42 may communicate data messages between each other via the data bus 44.

The electronic data processor 32 comprises a microcontroller, a microprocessor, a programmable logic array, a logic device, an arithmetic logic unit, a digital signal processor, an application specific integrated circuit or another device for processing or manipulating data. The data storage device 40 comprises electronic memory, nonvolatile random-access memory, magnetic storage device, an optical storage device, or another device for storing, retrieving and managing data, files, data structures or data records. The data ports 42 may comprise an input/output port, a data transceiver, a wireline transceiver, a wireless transceiver, buffer memory, or a combination of the foregoing items.

In one embodiment, the electronic data processor 32 or its data ports 42 are connected to or in communication with the control terminals 70 of the switches (e.g., primary switches 58 and the secondary switches 60) of the primary full bridge 10 and the secondary full bridge 12. Accordingly, the electronic controller 38 can control the timing and operation of each switch, such as activation time, deactivation time, biasing and other aspects. In one embodiment, the electronic controller 38 or electronic data processor 32 uses a fixed switching frequency of fundamental frequency (e.g., within an operational range of switching frequencies) of the switches for multiple or all modulation modes, such as the first mode, the second mode and the third mode. Further, the switches can operate with a same or substantially similar fixed duty cycle (e.g., 50 percent duty cycle plus or minus ten percent tolerance) for multiple or all modulation modes, such as the first mode, the second mode and the third mode. In some configurations, the peak magnitude and duration of the gate signal of the high-side switch 64 and low-side switch 62 of any pair or phase will generally be equal or substantially equivalent.

Although the DC primary terminals 84 (e.g., DC primary bus) and the DC secondary terminals 86 (e.g., DC secondary bus) have fixed voltage levels, the primary voltage ($V_1$) at (or across) the transformer primary winding 80, or the secondary voltage ($V_2$) at (or across) the transformer secondary winding 82, or both can vary.

In one embodiment, a first voltage sensor 46 (e.g., primary voltage sensor) is configured to measure the primary voltage (e.g., root-mean-squared voltage, peak voltage or other alternating current voltage measurement) and a second voltage sensor 48 (e.g., secondary voltage sensor) is configured to: (a) measure the observed primary and secondary voltages (e.g., root-mean-squared voltage, peak voltage or other alternating current voltage measurement) and (b) provide the measurements observed voltage readings of the primary voltage and secondary voltage (e.g., at the transformer terminals of the primary winding and secondary winding) to the electronic controller 38 via one or more data ports 42. In another embodiment, the first voltage sensor 46 and the second voltage sensor 48 may measure one or more of the following: alternating current (AC) voltage levels, root-mean-squared (RMS) voltage levels, or rectified alternating current (e.g., via a half-wave or full-wave bridge rectifier) at one or more transformer windings (80, 82). Further, the electronic controller 38 or electronic data processor 32 is configured to estimate the DC primary voltage at the DC primary input terminals 84 and the DC secondary voltage at the DC secondary output terminals 86 of the converter 11 based on the measurements, or can control the switches in an initialization mode or test mode to facilitate direct measurement of the primary voltage at the DC primary input terminals 84 and the secondary voltage at the DC secondary output terminals 86 of the converter.

Alternately, (e.g., during initialization mode or operational mode) the first voltage sensor 146 (in FIG. 1B) and the second voltage sensor 148 (in FIG. 1B) are configured to: (a) measure the primary voltage at the DC primary input terminals 84 and the secondary voltage at the DC secondary output terminals 86 of the converter 11, and (b) provide the measurements to the electronic controller 38 via one or more data ports 42. Accordingly, the observed primary voltage and the observed secondary voltage can be or are applied to one or more transferred power equations that apply to the respective control mode to estimate the maximum transferred power for each control mod, among other things.

Figure 1B:
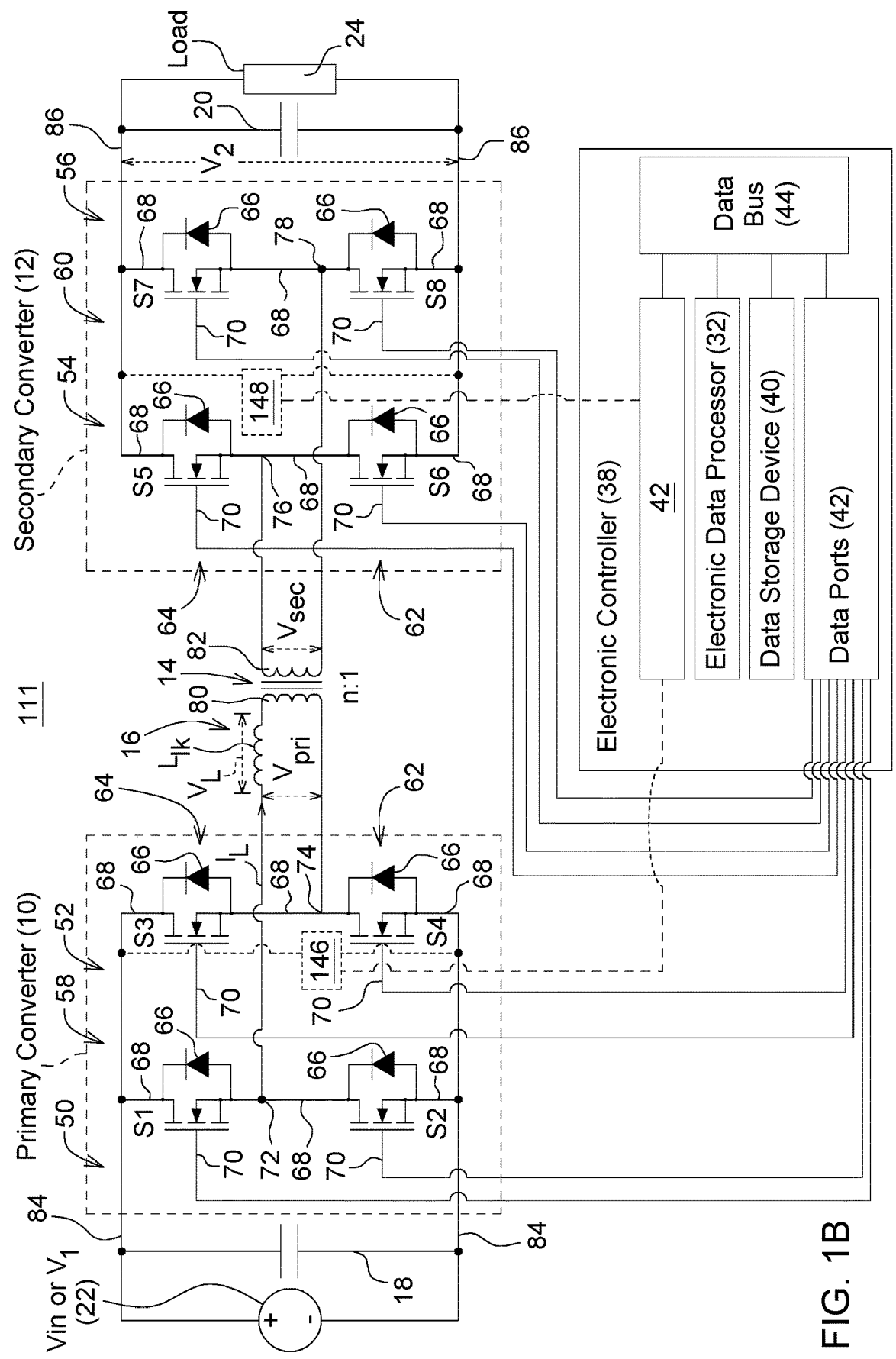
FIG. 1B is a schematic diagram of another embodiment of a direct-current-to-direct-current-converter that comprises a primary full bridge converter coupled to a secondary full bridge converter via a transformer.
Figure 4:
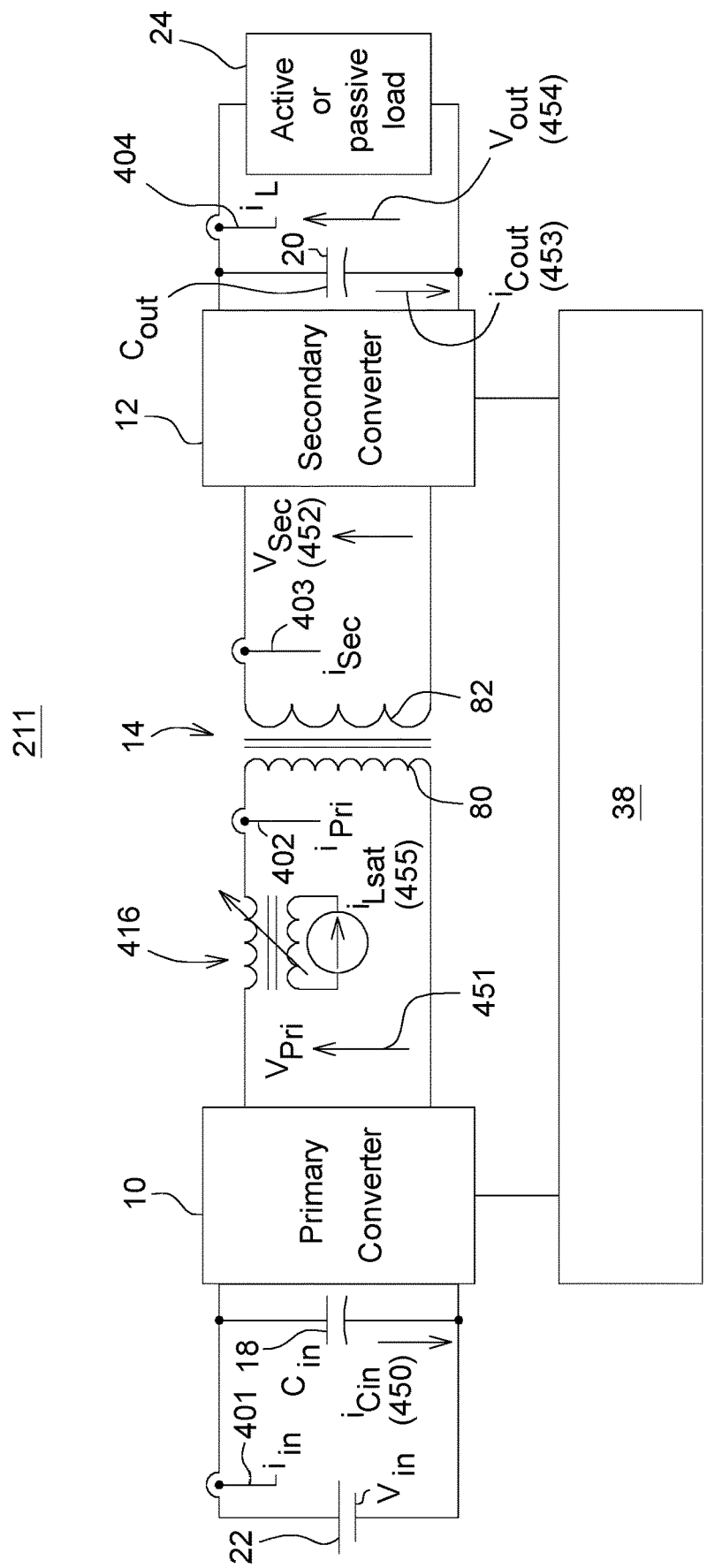
FIG. 4 is a block diagram of yet another embodiment of a direct-current-to-direct-current-converter that comprises a primary converter coupled to a secondary converter via a transformer and a variable inductor.

FIG. 1B is similar to FIG. 1A, except the first voltage sensor 46 and the second voltage sensor 48 of FIG. 1A are replaced by the first voltage sensor 146 and the second voltage sensor 148 of FIG. 1B. For example, the readings by a first voltage sensor 146 and a second voltage sensor 148 can be applied to the equations set forth in this document that call for the DC primary voltage ($V_1$ or $V_{in}$) at terminals 84 or DC secondary voltage ($V_2$ or $V_{out}$) at terminals 86, where $V_{in}$ and $V_{out}$ are illustrated in FIG. 4. In an alternate embodiment, the first voltage sensor 146 or the second voltage sensor 148 may be omitted if the DC primary voltage ($V_1$) is fixed or regulated within a certain tolerance and the second voltage sensor 148 may be omitted if the DC secondary voltage ($V_2$) is fixed or regulated within a certain tolerance (e.g., in accordance with design-specifications).

Figure 2:
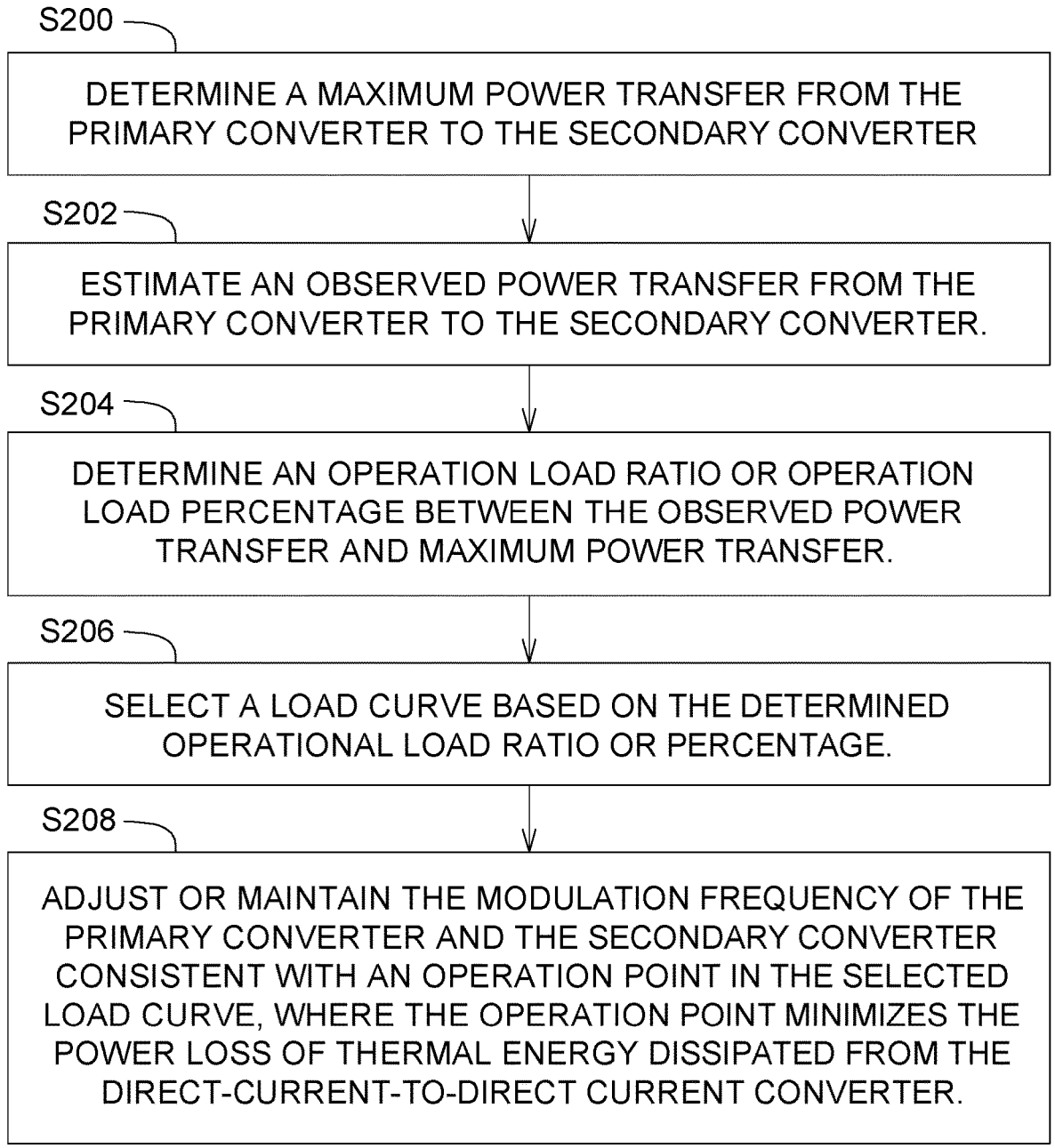
FIG. 2 is a flow chart of one embodiment of a method for controlling a direct-current-to-direct-current-converter to reduce thermal loading and to efficiently dissipate heat.

FIG. 2 is a flow chart of one embodiment of a method for controlling a direct-current-to-direct-current-converter (11 of FIG. 1A, 111 of FIG. 1B or 211 of FIG. 4) to reduce thermal loading and to efficiently dissipate heat, wherein a primary converter 10 is coupled to a secondary converter 12 via a transformer 14 (or. The method of FIG. 2 begins in step S200.

In step S200, an electronic data processor 32 or controller 38 determines a maximum power transfer from the primary converter 10 to the secondary converter 12 based on observed measurements and/or estimated parameters. For example, observed measurements may comprise measurements or observations of an input voltage ($V_{in}$ or $V_1$) to the primary converter 10, an output voltage ($V_2$ or $V_{out}$) of the secondary converter 12, a modulation frequency of the primary converter 10 and the secondary converter 12, and primary inductance (16, 416) in series with a primary winding 80 of the transformer 14. Alternately, the one or more observed measurements may be replaced with estimated parameter values, such as the input voltage and the output voltage in accordance with design specifications of the converter or the associated vehicle.

In accordance with step S200, the maximum power transfer between the primary converter 10 and the secondary converter 12 may be determined in accordance with various techniques, which may be applied separately or cumulatively.

Under a first technique, the electronic data processor 32 or controller 38 determines of the maximum power transfer from the primary converter 10 to the secondary converter 12 is based on or proportional to an input voltage to the primary converter 10, an output voltage of the secondary converter 12, a modulation frequency of the primary converter 10 and the secondary converter 12, and primary inductance (16, 416) in series with a primary winding 80 of the transformer 14.

Under a second technique, the data processor 32 or controller 38 determines the maximum power transfer from the primary converter 10 to the secondary converter 12 based on or proportional to an input voltage to the primary converter 10, an output voltage of the secondary converter 12, a modulation frequency of the primary converter 10 and the secondary converter 12, and primary inductance (16. 416) in series with a primary winding 80 of the transformer 14.

Under a third technique, the data processor 32 controller 38 determines of the maximum power transfer from the primary converter 10 to the secondary converter 12. The maximum power transferred is determined in accordance with the following equation:

$$P_{max} = \frac{nV_{in}V_{out}}{Kf_{PWM}L_{ser}}$$

where $P_{max}$ is the maximum power transfer; n is transformer turn-ratio; $V_{in}$ is input DC voltage to the primary converter 10 at the DC primary terminals (84; $V_{out}$ is the output DC voltage of the secondary converter 12 associated with DC secondary terminals (86); $f_{PWM}$ is the modulation frequency or switching frequency of the switches; K is a constant (e.g., 8 in case of single-phase dual-active bridge based DC/DC converter), and L (e.g., $L_{lk}$) is the inductance, such as variable inductance, alone or together with, a transformer inductance modeled as a model inductance in series with a primary winding 80 of the transformer 14.

In step S202, the data processor 32 or the controller 38 estimates an observed power transfer from the primary converter 10 to the secondary converter 12, or vice versa (e.g., for a bi-directional converter). In accordance with step S202, the observed power transfer between the primary converter 10 and the secondary converter 12 may be determined in accordance with various procedures, which may be applied separately or cumulatively.

Under a first procedure, the data processor 32 or the controller 38 estimates of the observed power transfer from the primary converter 10 to the secondary converter 12 is based on or proportional to an observed input voltage ($V_1$ or $V_{in}$) to the primary converter 10, an observed output voltage ($V_2$ or $V_{out}$) of the secondary converter 12, a modulation frequency of the primary converter 10 and the secondary converter 12, and a primary inductance in series with a primary winding of the transformer.

Under a second procedure, the data processor 32 or the controller 38 estimates of the observed power transfer from the primary converter 10 to the secondary converter 12 is determined in accordance with the following equation:

$$P_{observed} = \frac{nV_{in\text{-}observed}V_{out\text{-}observed}}{Kf_{PWM}L_{ser}}$$

where $P_{observed}$ is the observed power transfer, n is transformer turn-ratio, $V_{in\text{-}observed}$ is a measured or observed input DC voltage to the primary converter 10 at the DC primary terminals; $V_{out\text{-}observed}$ is a measured or observed output DC voltage of the secondary converter 12 associated with DC secondary terminals; K is a constant (e.g., 8); $f_{PWM}$ is the modulation frequency or switching frequency of the switches; and L is the transformer inductance modeled as a model inductance in series with a primary winding of the transformer.

In step S204, the data processor 32 or the controller 38 determines an operational load ratio or operational load percentage between the observed power transfer and maximum power transfer. For example, the operational load ratio is the observed power transfer (numerator) divided by the maximum power transfer (denominator), where the operation load ratio can also be expressed as a percentage of load (maximum or total load at a converter output).

In step S206, the data processor 32 or the controller 38 selects or references load curve data (e.g., load curve) based on the determined operational load ratio or percentage. The load curve data may comprise a load curve, a load region, or one or more target load operating points associated with the load curve or the load region, a look-up table of points on corresponding load curves, or an equation (e.g., quadratic equation) that defines the load curve data. The load curve data may be stored, accessed or retrieved from a data storage device 40 associated with or in communication with the data processor 32. The load curve is selected from a set of load curves stored in a look-up table (e.g., in the data storage device 40), where each of the load curves is associated with a corresponding ratio or percentage between the observed power transfer and maximum power transfer.

In step S208, the data processor 32 or the controller 38 adjusts or maintaining the modulation frequency (e.g., pulse width modulation (PWM) frequency) of the primary converter 10 and the secondary converter 12 consistent with an operation point on the selected load curve data (e.g., load curve), where the operation point minimizes the power loss, power difference or thermal energy dissipated from the direct-current-to-direct current converter.

Step S208 may be executed in accordance with various techniques, which may be applied separately, or cumulatively. Under a first technique, the power difference is estimated as a function of DC input voltage of the converter, DC output voltage of the converter, DC input current of the converter, and DC output current of the converter Under a second technique, the power difference is estimated in accordance with the following equation:

$$P_{diff} = (V_{in} \times i_{in}) - (V_{out} \times i_L),$$

where Vin is observed or design-specified DC input voltage of the converter; Vout is observed or design-specified DC output voltage of the converter; $i_{in}$ is observed DC input current of the converter, and $i_L$ is observed DC output current of the converter.

Under a third technique, the power loss is estimated as a function of first power loss of the primary converter, a second power loss of secondary converter, and a third power loss of the transformer and an associated variable inductor in series with a primary winding of the transformer.

Under a fourth technique, the power loss is estimated in accordance with the following equation:

$$P_{Loss} = L_{PC} + L_{SC} + L_M,$$

where $L_{PC}$ is power loss associated with the primary converter, $L_{SC}$ is power loss associated with the secondary converter, and $L_M$ is power loss associated with the magnetic circuit.

Figure 3:
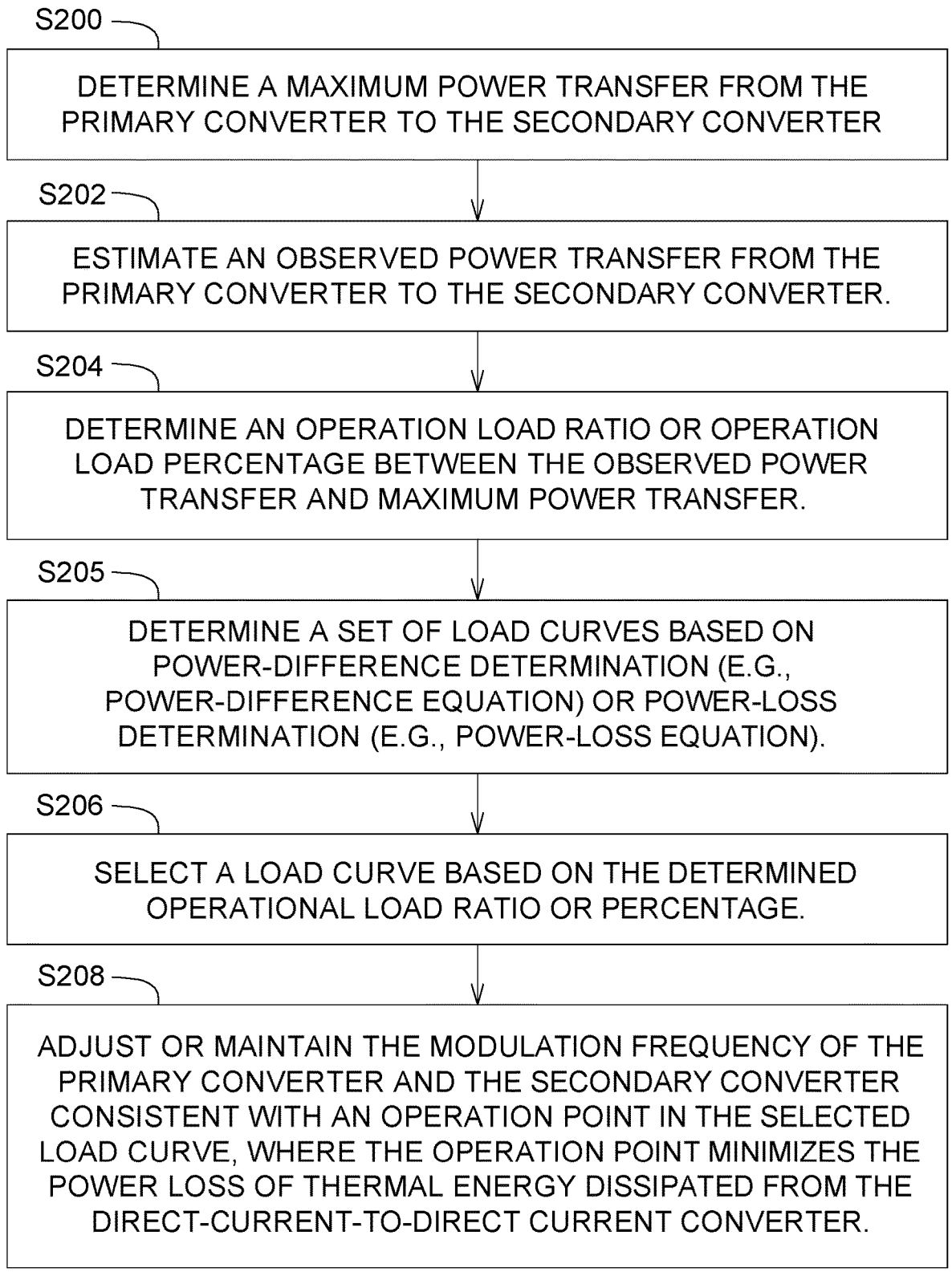
FIG. 3 is a flow chart of method of another embodiment for controlling a direct-current-to-direct-current-converter to minimize power loss to reduce the thermal energy dissipated from the converter.

FIG. 3 is a flow chart of method of another embodiment for controlling a direct-current-to-direct-current-converter to minimize power loss to reduce the thermal energy dissipated from the converter. The method of FIG. 3 is similar to the method of FIG. 2, except the method of FIG. 3 further comprises step S205. Like reference numbers in FIG. 2 and FIG. 3 indicate like steps, procedures or features.

In step S205, the data processor 32 or the controller 38 determines a set of load curves based on power-difference determination (e.g., power-difference equation) or power-loss determination (e.g., power loss equation). For example, the data processor 32 or the controller 38 estimates one or more equations or parameters that can be expressed in quadratic form to model accurately the power difference loss versus modulation frequency of the converter or the power difference loss versus modulation frequency of the converter for corresponding percentage loads or commanded loads.

FIG. 4 is a block diagram of yet another embodiment of a direct-current-to-direct-current-converter that comprises a primary converter 10 coupled to a secondary converter 12 via a transformer (e.g., isolation transformer) and a variable inductor. The converter of FIG. 4 is similar to the converter of FIG. 1A and FIG. 1B, except the converter of FIG. 4 replaces inductor 16 of FIG. 1A with a variable inductor 416 in series with the primary winding 80 of the transformer 14. Further, the electronic data processor 32 or electronic controller 38 can control the control inputs of switches to control or adjust the variable inductance of the variable inductor. The primary converter 10 may comprise an H-bridge, such as a first pair and second pair of primary switches. The secondary may comprise an H-bridge, such as a first pair and second pair of secondary switches. The converter 211 supports bi-directional flow of energy between the converter input terminals and output terminals.

In one embodiment, consistent with FIG. 4, the primary converter 10 receives or draws power from a DC voltage-source 22 ($V_{in}$) and converts the received power to an isolated voltage-source, $V_{out}$ (454), which is output of the secondary converter 12. The high-frequency pulse-width-modulated (PWM) switching of semiconductor switches in the primary converter 10 produces ripple current, $i_{Cin}$, (450) which will flow through (e.g., and be filtered, smoothed, or attenuated by) input capacitor 18 ($C_{in}$). The PWM switching of the primary converter 10 produces PWM voltage waveforms ($V_{Pri}$) 451, which results in flow of current ($i_{Pri}$) 402 through series variable inductor ($L_{ser}$) 416. The primary current ($i_{Pri}$) 402 establishes flux in the magnetic core of the isolation transformer 14.

Further, PWM switching of the secondary converter 12 is phase-shifted and time synchronized with respect to the PWM switching of the primary converter 10. Therefore, secondary converter 12 produces PWM voltage, ($V_{Sec}$) 452, which results in flow of secondary current ($i_{Sec}$) 403. The primary current ($i_{Pri}$) 402 and secondary current ($i_{Sec}$) 403 are directly related to each as per isolation transformer turn-ratio (n:1) provided that the magnetizing current of isolation transformer is negligibly small. The PWM switching of secondary converter 12 also generates ripple current, $i_{Cout}$, 453 which flows through output capacitor ($C_{out}$) 20 (e.g., to filter, smooth or attenuate the ripple current). The load current 404 is denoted as $i_L$ and output voltage across load is denoted as $V_{out}$ 454.

In FIG. 4, the controller 38 or electronic data processor 32 is configured to determine the maximum power transfer from the primary converter 10 to the secondary converter 12 is based on or proportional to an input voltage to the primary converter 10, an output voltage of the secondary converter 12, a modulation frequency of the primary converter 10 and the secondary converter 12, and primary inductance or variable inductor 416 in series with a primary winding 80 of the transformer 14.

In FIG. 4, the converter or system comprises a controller 38 or electronic data processor 32 that is configured to determine maximum power transfer from the primary converter 10 to the secondary converter 12 in accordance with the following equation:

$$P_{max} = \frac{nV_{in}V_{out}}{Kf_{PWM}L_{ser}}$$

where $P_{max}$ is the maximum power transfer; n is transformer turn ratio; $V_{in}$ is input DC voltage to the primary converter 10 at the DC primary terminals; $V_{out}$ is the output DC voltage of the secondary converter 12 associated with DC secondary terminals; $f_{PWM}$ is the modulation frequency or switching frequency of the switches; K is a constant (e.g., 8), and L is the transformer inductance modeled as a model inductance in series with a primary winding of the transformer.

Further, the controller 38 or electronic data processor 32 is configured to estimate the observed power transfer from the primary converter 10 to the secondary converter 12 is based on or proportional to an observed input voltage to the primary converter 10, an observed output voltage of the secondary converter 12, a modulation frequency of the primary converter 10 and the secondary converter 12, and a primary inductance in series with a primary winding of the transformer. For example, the controller 38 or data processor 32 is configured to estimate of the observed power transfer from the primary converter 10 to the secondary converter 12 is determined in accordance with the following equation:

$$P_{observed} = \frac{nV_{in\text{-}observed}V_{out\text{-}observed}}{Kf_{PWM}L_{ser}}$$

where $P_{observed}$ is the observed power transfer, n is transformer turn ratio, $V_{in\text{-}observed}$ is a measured or observed input DC voltage to the primary converter 10 at the DC primary terminals; $V_{out\text{-}observed}$ is a measured or observed output DC voltage of the secondary converter 12 associated with DC secondary terminals; $f_{PWM}$ is the modulation frequency or switching frequency of the switches; K is a constant (e.g., 8) and L is the transformer inductance modeled as a model inductance in series with a primary winding of the transformer. In one embodiment, the load curve data (e.g., load curve) is selected from a set of load curves stored in a look-up table, each of the load curves associated with a corresponding ratio or percentage between the observed power transfer and maximum power transfer.

Figure 6A:
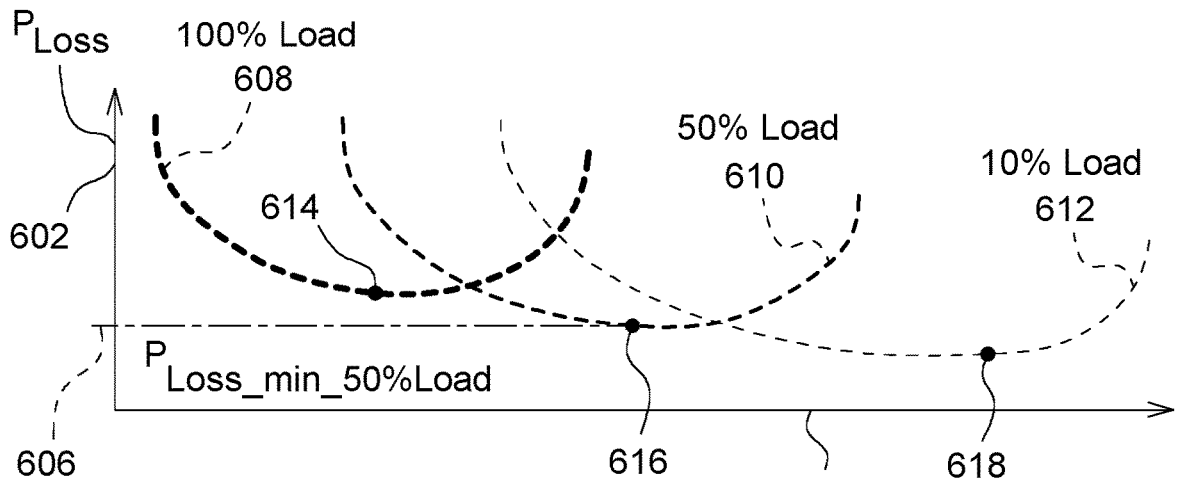
FIG. 6A is a graph of converter power loss versus modulation frequency, along with associated load curves at different load percentages or ratios.
Figure 6B:
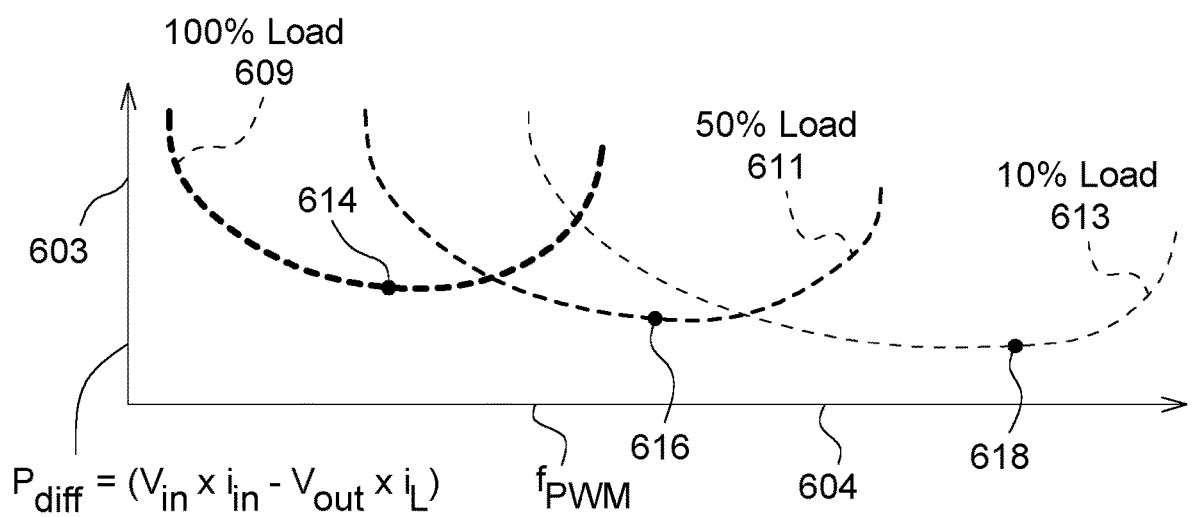
FIG. 6B is a graph of converter power difference versus modulation frequency, along with associated load curves at different load percentages or ratios.

In one embodiment, the percentage load in each of the load curves of FIG. 6A and FIG. 6B is determined by the ratio of observed power transfer ($P_{observed}$) to maximum power transfer ($P_{max}$) is the maximum power transfer, multiplied by 0.01.

Figure 5:
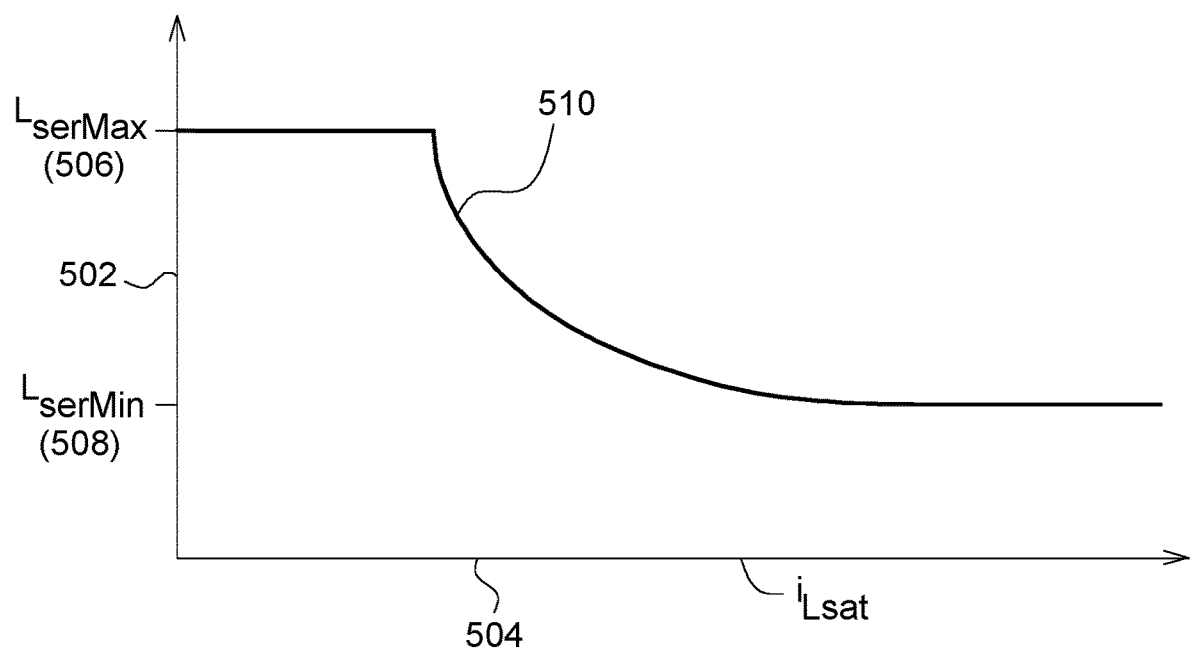
FIG. 5 is a graph of inductance of the variable inductor of FIG. 4 versus saturation current flowing through the variable inductor.

FIG. 5 is a graph of inductance of the variable inductor of FIG. 4 versus saturation current flowing through the variable inductor. The vertical axis indicates inductance 502; the horizontal axis indicates inductor current 504, such as inductor saturation current ($i_{Lsat}$) 455. As illustrated, the inductance of the variable inductor 416 can vary consistent with the applicable power curve (e.g., Pmax) 510 between a maximum inductance ($L_{serMax}$) 506 and a minimum inductance ($L_{serMin}$) 508. In FIG. 5, the graph or curve of variable inductance 502 versus inductor saturation current 504 flowing through the variable inductor is consistent with the maximum power transfer from the primary converter 10 to the secondary converter 12 in accordance with the following equation:

$$P_{max} = \frac{nV_{in}V_{out}}{Kf_{PWM}L_{ser}}$$

where $P_{max}$ is the maximum power transfer; n is transformer turn ratio; $V_{in}$ is input DC voltage to the primary converter 10 at the DC primary terminals; $V_{out}$ is the output DC voltage of the secondary converter 12 associated with DC secondary terminals; $f_{PWM}$ is the modulation frequency or switching frequency of the switches; K is a constant (e.g., 8), and L is the transformer inductance modeled as a model inductance in series with a primary winding of the transformer.

FIG. 6A is a graph of converter power loss (PLoss) versus modulation frequency ($f_{PWM}$), along with associated load curves at different load percentages or ratios. In FIG. 6A the vertical axis represents converter power loss 602 and the horizontal axis references modulation frequency 604. As illustrated, the load curves (610, 612) for higher loads operate with thermal efficiency at lower modulation frequencies 604, whereas the load curves for lesser loads (610, 612) operate with thermal efficiency at higher modulation frequencies 604.

In the illustrative example of FIG. 6A, load curve data (e.g., load curves) for three discrete load percentages or load ratios are illustrated, although in practice any number of load percentages or load ratios may be used. In FIG. 6A first load curve 608 represents 100 percent load or commanded load; the second load curve 610 represents a 50 percent load or commanded load; the third load curve 612 represents a 10 percent load or commanded load.

The load percentages are equal to or proportional to: (1) a ratio of observed load divided by maximum load and then multiplied by 0.01, or (2) a ratio of commanded load divided by maximum load and then multiplied by 0.01 (or divided by 100). In FIG. 6A, first load curve 608, at 100% load, is illustrated in greater thickness dashed lines, a second load curve 610, at 50% load, is illustrated in medium thickness dashed lines, a third load curve 612, at 10% load, is illustrated in lesser thickness dashed lines. The preferred first operational point 614 on the first load curve 608 or load line coincides with a point, segment or region of the first load line 608 associated with a respective minimum power operating loss of the converter (11, 111, 211); the preferred second operational point 616 of the second load curve 610 or load line coincides with a point, segment or region of the second load curve 610 or load line associated with a respective minimum power operating loss of the converter; the preferred third operational point 618 of the third load curve or load line coincides with a point, segment or region of the third load curve 612 or load line associated with a respective minimum power operating loss of the converter.

FIG. 6B is a graph of converter power difference ($P_{diff}$) versus modulation frequency ($f_{PWM}$), along with associated load curves at different load percentages or ratios. In FIG. 6A the vertical axis represents converter power difference and the horizontal axis references modulation frequency. As illustrated, the load curves for higher loads operate with thermal efficiency at lower modulation frequencies, whereas the load curves for lesser loads operate with thermal efficiency at higher modulation frequencies.

In the illustrative example of FIG. 6B, load curve data (e.g., load curves) for three discrete load percentages or load ratios are illustrated, although in practice any number of load percentages or load ratios may be used. In FIG. 6A first load curve 609 represents 100 percent load or commanded load; the second load curve 611 represents a 50 percent load or commanded load; the third load curve 613 represents a 10 percent load or commanded load.

The load percentages are equal to or proportional to: (1) a ratio of observed load divided by maximum load and then multiplied by 0.01, or (2) a ratio of commanded load divided by maximum load and then multiplied by 0.01 (or divided by 100). In FIG. 6B, first load curve 609 at 100% load is illustrated in greater thickness dashed lines; a second load curve 611 at 50% load is illustrated in medium thickness dashed lines, a third load curve 613 at 10% load is illustrated in lesser thickness dashed lines. The preferred first operational point 614 on the first load curve 609 or load line coincides with a point, segment or region of the first load curve 609 associated with a respective minimum power operating loss of the converter (11, 111, 211); the preferred second operational point 616 of the second load curve 611 or load line coincides with a point, segment or region of the second load line associated with a respective minimum power operating loss of the converter; the preferred third operational point 618 of the third load curve or load line coincides with a point, segment or region of the third load curve 613 associated with a respective minimum power operating loss of the converter.

FIG. 6A and FIG. 6B illustrate examples of load curve data. In practice, there may be any number (e.g., thousands) of load-dependent power-loss versus PWM frequency curves, however, for simplicity and clarity only three curves are illustrated in FIG. 6A and FIG. 6B.

Figure 7:
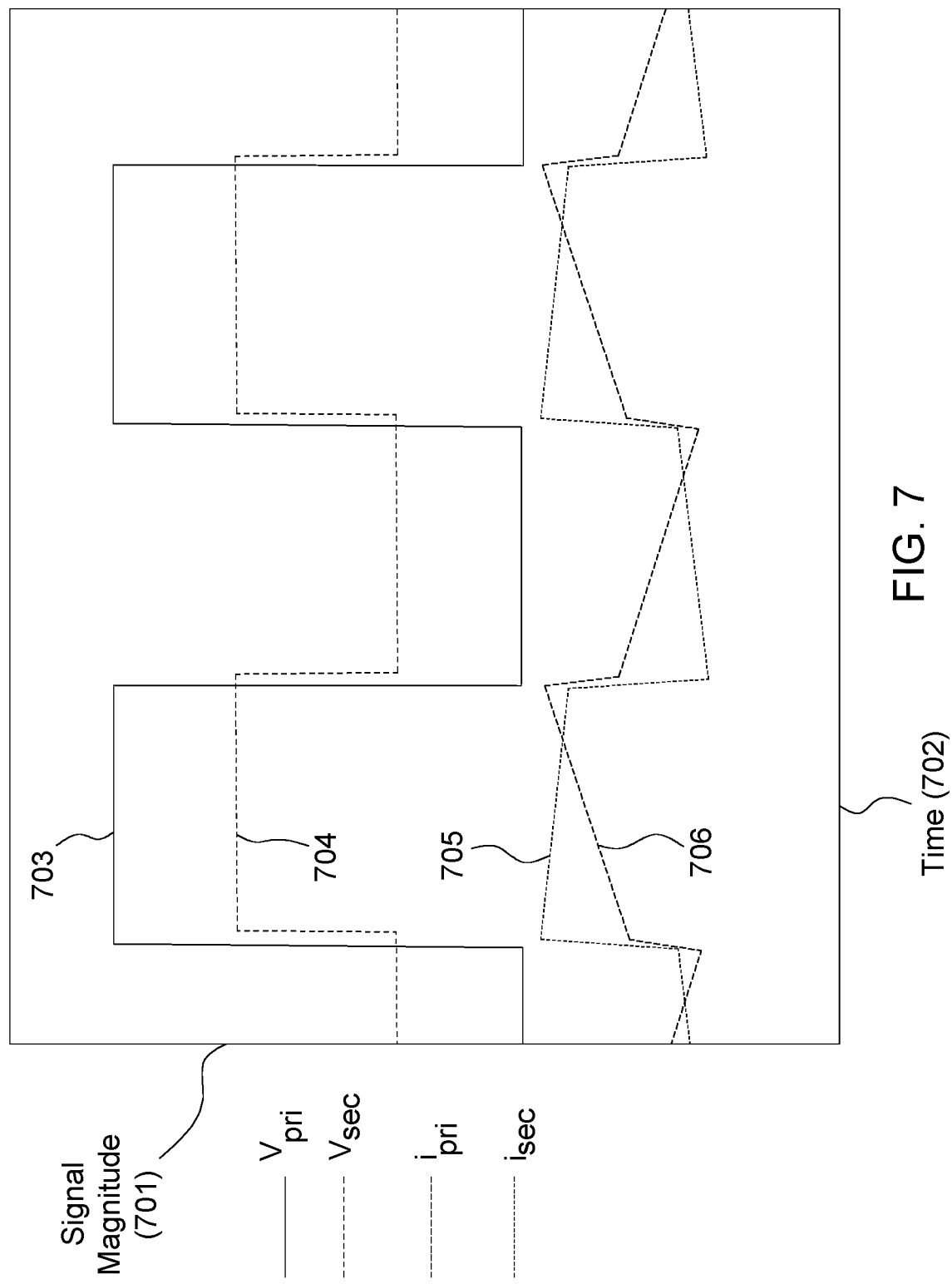
FIG. 7 is a graph of signal magnitude versus time for the primary voltage, the secondary voltage, the primary current and the secondary current within the converter.

FIG. 7 is a graph of signal magnitude 701 versus time 702 for the primary voltage, the secondary voltage, the primary current and the secondary current within the converter. The vertical axis indicates signal magnitude 701 in units of volt and ampere, whereas the horizontal axis indicates time 702 (e.g., in units of seconds or milliseconds). As illustrated in FIG. 7, the primary voltage 703 ($V_{pri}$) is indicated by solid line; the secondary voltage 704 ($V_{sec}$) is indicated by a dashed line of medium length dashes, the primary current 705 ($i_{pri}$) is indicated by a dashed line of longer length dashes; and the secondary current 706 ($i_{sec}$) is indicated by a dashed line of shorter length dashes. Although the primary voltage is illustrated as greater than the secondary voltage in FIG. 7, in an alternate embodiment, the primary voltage may be less than or equal to the secondary voltage. Here, the primary voltage may be associated with a higher voltage vehicle direct current bus (e.g., 700 VDC), whereas the secondary voltage may be associated with a lower voltage direct current bus (e.g., 12 VDC to 48 VDC). The primary current and the secondary current have minimum and maximum currents that occur at different times because of the phase delay or phase offset between the primary winding and secondary winding of the transformer.

Figure 8:
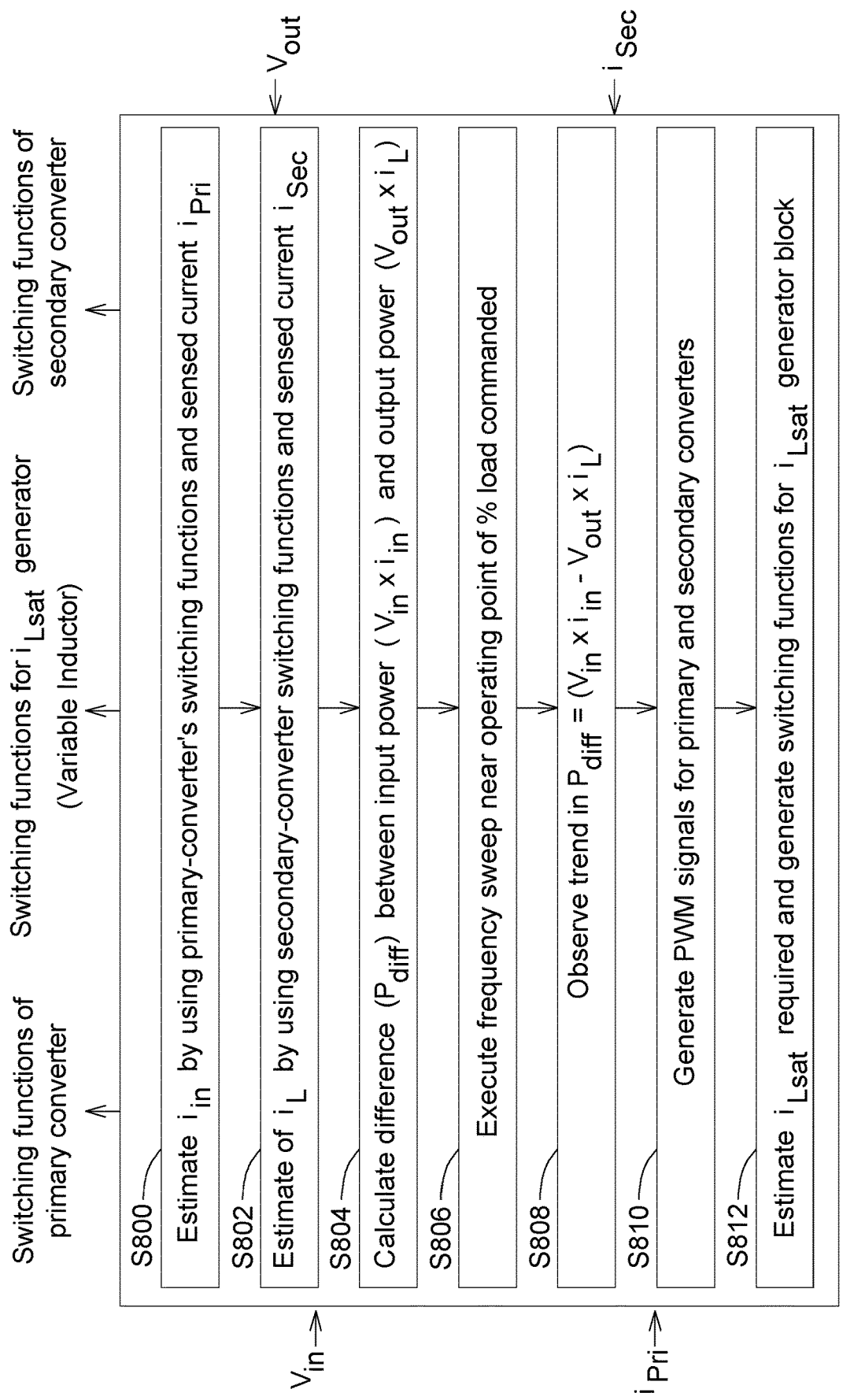
FIG. 8 is a block diagram of the control logic for the converter to output switching control signals at target modulation frequency for the primary converter, the secondary converter and the variable inductor based on observations/measurements of inverter input voltage, inverter output voltage, primary current and secondary current.

FIG. 8 is a block diagram of the control logic of power difference minimization for the converter to output switching control signals at target modulation frequency for the primary converter 10, the secondary converter 12 and the variable inductor based on observations/measurements of inverter input voltage, inverter output voltage, primary current and secondary current. The current and voltages referenced in the steps of FIG. 8 are defined consistent with FIG. 4, for example.

In step S800, the data processor 32 or data controller 38 estimates (direct current (DC)) input current ($i_{in}$) at the input terminals of the primary converter 10. For example, under a first procedure the data processor 32 or data controller 38 estimates DC input current ($i_{in}$) at the primary converter 10 by controlling the primary converter's switching functions and making simultaneous observations or measurements from one or more sensors (e.g., voltage sensor, current sensor, or other sensor circuitry). Separately or cumulatively with the first procedure, under a second procedure, the data processor 32 or data controller 38 estimates the DC input current ($i_{in}$) to the primary converter 10 by observations or measurements of the alternating current (AC) primary current ($i_{pri}$) at the input of the primary winding of the transformer by a current sensor.

In step S802, the data processor 32 or data controller 38 estimates the converter output DC current ($i_L$) at the output terminals of the secondary converter 12 by using secondary converter's switching functions and sensed (observed) secondary current ($i_{sec}$). For example, under a first technique the data processor 32 or data controller 38 estimates AC input current ($i_{sec}$) to the secondary converter 12 by controlling the secondary converter's switching functions and making simultaneous observations or measurements from one or more sensors (e.g., a current sensor, voltage sensor or other sensor circuitry) in or associated with the secondary converter 12. Separately or cumulatively with the first technique, under a second technique, the data processor 32 or data controller 38 estimates, the direct current) output current ($i_L$) from the secondary converter 12 by observations or measurements of one or more sensors (voltage sensors) by aiding, augmentation or verification the estimation of the direct current secondary current ($i_{sec}$).

In step S804, the data processor 32 or data controller 38 calculates the difference ($P_{diff}$) between input power and output power, where input power ($P_{in}$) and output power (Pout) are defined in accordance with the following equations, respectively:

$$P_{in}=V_{in} \times i_{in};$$

$$P_{out}=V_{out} \times i_L;$$

where $V_{in}$ is the DC input voltage across the input terminals of the primary converter 10; where $i_{in}$ is the DC current associated with the DC input terminals of the primary converter 10; $V_{out}$ is the DC output voltage across output terminals of the secondary converter 12, and $i_L$ is the DC current through an active or passive load associated with the secondary converter 12 output or the converter output. In general, power difference is defined or estimated as a function of DC input voltage of the converter, DC output voltage of the converter, DC input current of the converter, and DC output current of the converter For example, the DC input voltage and the DC output voltage may be measured, directly or indirectly, or based on design specifications of a first DC bus coupled to the DC input terminals of the converter and the second DC bus coupled to the DC output terminals of the converter.

In step S806, the data processor 32 or data controller 38 executes a frequency sweep of a modulation frequency within a target range or target bandwidth near the operating point of the applicable load curve data (e.g., load curve) associated with the commanded percent load or percent load observed. The commanded percent load or percent load observed can be derived from a ratio of observed output power or commanded output power to maximum output power, where observed or commanded output power is determined in accordance with the following equation.

$$P_{out\ observed} = V_{out\ observed} \times I_{L\ observed};$$

where $V_{out}$ observed observed is observed or commanded output voltage at the secondary converter 12 output and where $i_{L\ observed}$ is observed or commanded output voltage at the secondary converter 12 output.

During or after step S806 in step S808, the data processor 32 or data controller 38 observes the trend in power loss difference based on or consistent with the power loss difference in accordance with the following equation:

$$P_{diff} = (V_{in} \times i_{in}) - (V_{out} \times i_L);$$

where $Vi_n$ is observed or design-specified DC input voltage of the converter; $V_{out}$ is observed or design-specified DC output voltage of the converter; $i_{in}$ is observed DC input current of the converter, and $i_L$ is observed DC output current of the converter.

For example, in step S808, during the frequency sweep the data processor 32 or data controller 38: (a) selects or identifies (an observed or estimated) preferential minimum power loss or minimum power loss difference associated with the applicable load curve data (e.g., among a set of candidate minimum power losses); and (b) selects or determines a modulation frequency (fPWM) associated with the corresponding preferential minimum power loss or preferential minimum power loss difference.

In accordance with one embodiment, the performance of the converter (e.g., Dual-Active-Bridge (DAB), DC-to-DC converter) can be optimized by selecting or determining a pulse-width-modulation (PWM) frequency that corresponds to maximum efficiency at that operating point for a time interval. The data processor 32 may need to update the modulation on a regular basis, such as at each time interval to maintain, select or determine the maximum efficiency if converter input voltage varies, if converter output voltage varies, or if output power varies (e.g., in conjunction with percent load or percent commanded load) because of transient load conditions (e.g., of an active load or passive load). For example, at each interval, the data processor 32 can select a new updated modulation frequency if the output power varies from a first percentage output load (e.g., 10%) to a second percentage output load (e.g., 100%), or vice versa to provide efficient thermal management consistent with applicable load curve data for the converter. The method of FIG. 8 supports a data processor 32 updating an operating point on regular basis (e.g., dynamically at each interval) to optimize the control method for maximum possible efficiency, while losing minimal possible energy, which facilitates enhanced thermal management.

For the power difference method, the electronic data processor 32 estimates the power at input of primary converter 10 ($P_{in}$) and power at output of secondary converter 12 ($P_{out}$). Then, the difference between $P_{in}$ and $P_{out}$ is calculated, where the difference is denoted as $P_{diff}$.

For example, to estimate $P_{in}$, power signals $V_{in}$ (measured) $i_{in}$ (estimated) are used. To estimate $i_{in}$, primary converter 10 output current ($i_{Pri}$) is measured and then using PWM signals of primary converter 10 along with $i_{Pri}$, quantity $i_{in\_unfiltered}$ is estimated and passed through a low-pass filter, which results in the primary converter 10 input current; $i_{in}$.

Similarly, to estimate $P_{out}$, quantities $V_{out}$ (measured) and $i_L$ (estimated) are used. To estimate $i_L$, secondary converter 12 input current ($i_{Sec}$) is measured and then using PWM signals of secondary converter 12 along with $i_{Sec}$, quantity $i_{L\_unfiltered}$ is estimated and passed through a low-pass filter, which results in the load current; $i_L$.

After the controller 38 or data processor 32 estimates $P_{diff}$, the quantity $P_{diff}$ is observed while sweeping or scanning the PWM switching frequency on or in conjunction with one or more a load-dependent curves or curve load data for each sampling time interval to identify an operational point on the curve load data with minimum power loss ($P_{diff\_min}$) of the converter. Once $P_{diff\_min}$ operating point is identified on a load-dependent curve, the controller 38 or data processor 32 keeps operating at self-tuned PWM frequency until load is changed.

In step S810, the data processor 32 or the data controller 38 generates the selected or determined modulation frequency to control the primary converter 10 and the secondary converter 12. For example, the data processor 32 data controller 38 generates control signals or synchronized control signals to control the activation and deactivation of semiconductor switches in the primary converter 10 and the secondary converter 12. In one example, the control signals are applied to the control terminal of the semiconductor switch, such as gate terminal or a base terminal of a transistor.

In step S812, the data processor 32 or data controller 38 estimates the inductor saturation current ($i_{Lsat}$) required and generates control signals or switching signals for one or more switches (associated with a network of inductors that can be switched in or out of a circuit) to select a target inductance level associated with a corresponding variable inductor current. Referring to FIG. 4, the inductor saturation current ($i_{Lsat}$) 455 corresponds to alternating current that flows through the variable inductor and the primary winding of the transformer, which is consistent with the selected modulation frequency (e.g., and operational point on the associated load curve data). Accordingly, the data processor 32 or data controller 38 is well suited to select or determine a modulation frequency and the variable inductance to minimize the power loss associated with the primary converter 10, the secondary converter 12, or both; hence, reduce the heat dissipation/cooling requirements for the entire converter.

In one embodiment, the controller 38 or data processor 32 determines transformer parameters, variable inductance values, or both using sense voltage $V_{in}$, PWM switching functions, and signature of $i_{Pri}$. To train or calibrate the data processor 32 or controller 38 of the converter or system, at each initialization or start-up of the converter, short duration known PWM waveforms will be produced for power signals, $v_{pri}$ and $v_{Sec}$ in sequence and then signatures of $i_{Pri}$ and $i_{Sec}$ will be observed to determine transformer parameters. The above training scheme for the controller 38 or data processor 32 of the controller 38 learns converter behavior. By learning converter behavior, it will be possible to track system related parameter changes over time, such as if the electronic components or circuit board of the converter or system changes over time, which could trigger predictive maintenance of the converter. This is kind of application of machine learning (ML) technique in prognostics and diagnostics of the DC/DC converter that could support objective of predictive maintenance.

Figure 9:
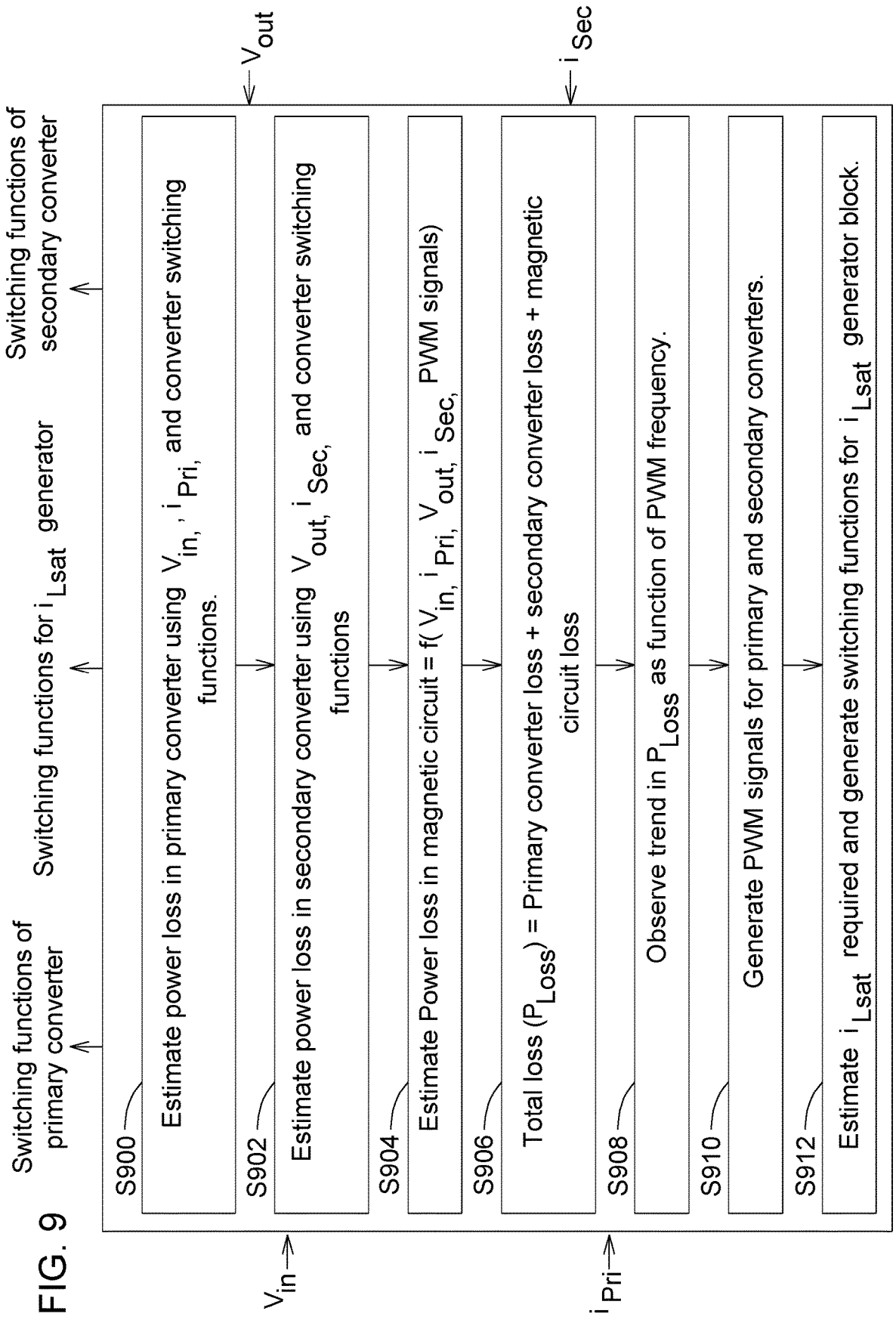
FIG. 9 is a block diagram of the control logic for the converter to output switching control signals at target modulation frequency for the primary converter, the secondary converter and the variable inductor based on observations/measurements of inverter input voltage, inverter output voltage, primary current and secondary current.

The control logic of FIG. 9 is similar to the control logic of power difference minimization of FIG. 8 except that the control logic of FIG. 9 relates to the power loss minimization process, which is based on minimizing the total loss contributions from different components of the converter. FIG. 9 is a block diagram of the control logic for the converter to output switching control signals at target modulation frequency for the primary converter 10, the secondary converter 12 and the variable inductor based on observations/measurements of inverter input voltage, inverter output voltage, primary current and secondary current. The current and voltages referenced in the steps of FIG. 9 are defined consistent with FIG. 4, for example. In accordance with one embodiment of the control logic of FIG. 9, the data controller 38 or data processor 32 estimates energy losses in various components of the DC/DC converter then controller 38 searches for family of load-dependent power-loss curves to select an applicable load-dependent power loss curve.

In step S900, the electronic data processor 32 or controller 38 estimates power loss in the primary converter 10. For example, the electronic data processor 32 or controller 38 estimates power loss in the primary converter 10 by using the (DC) input voltage ($V_{in}$) at the input terminals of the primary converter 10 and the primary alternating current (AC) output voltage ($V_{pri}$) at the output terminals of the primary converter 10, and converter switching functions of the primary converter 10 in conjunction with one or more voltage sensors or current sensors associated with the primary converter 10.

In step S902, the data processor 32 or controller 38 estimates power loss in the secondary converter 12 using the secondary DC output voltage ($V_{out}$) at the output terminals of secondary converter 12, the AC input current ($i_{sec}$) at the input terminals of the secondary converter 12.

In step S904, the data processor 32 or controller 38 estimates power loss in the magnetic circuit, where the magnetic circuit power loss is a function of one or more of the following: (a) the DC input voltage ($V_{in}$) at the input terminals of the primary converter 10, (b) the AC current flowing ($i_{pri}$) in the primary winding of the transformer at the output of the primary converter 10, (c) the DC output voltage ($V_{out}$) at the output terminals of the secondary converter 12, (d) the AC current flowing (isec) in the secondary winding of the transformer at the input of the secondary converter 12, and (e) the modulation signal, such as the modulation frequency, phase offset and synchronization of the pulse width modulation signals, applied to the switches of the primary converter 10 and the secondary converter 12. In one embodiment, the magnetic circuit comprises an electromagnetic circuit of the transformer, alone or together with a variable inductor in series with the primary winding of the transformer). The magnetic circuit can be modeled at alternating current frequencies, for instance. Further, the modulation signal can be structured as soft switching events, by controlling proper sequence and synchronization of the control signals applied to the switches of the converter, to reduce switching or power loss.

In step S906, the data processor 32 or controller 38 estimates the total loss ($P_{Loss}$) based on a first power loss associated with the primary converter 10, a second power loss associated with the secondary converter 12 and a magnetic circuit loss (associated with the transformer, alone or together with the variable inductor). In general, power loss is defined estimated as a function of first power loss of the primary converter 10, a second power loss of secondary converter 12, and a third power loss of the transformer and an associated variable inductor in series with a primary winding of the transformer, which can be used to estimate the required capacity or size of the transformer.

Accordingly, total power loss ($P_{Loss}$) can be estimated in accordance with the following equation:

$$P_{Loss} = L_{PC} + L_{SC} + L_M,$$

where $L_{PC}$ is power loss associated with the primary converter 10, $L_{SC}$ is power loss associated with the secondary converter 12, and $L_M$ is power loss associated with the magnetic circuit.

In step S908, the electronic data processor 32 or electronic controller 38 records a series of observations of the estimated total power loss as a function of modulation frequency to establish or more power loss curves or power loss data sets. For example, the data processor 32 or electronic controller 38 may observe trends (e.g., minimization of power loss) in the estimated total power loss as a function of modulation frequency (e.g., pulse width modulation frequency). In one example, the data processor 32 may use a least squares search method to identify the minimum or minima associated with the estimated total power loss as a functional of modulation frequency.

In one configuration, once the controller 38 or data processor 32 estimates or observes the observed output load or commanded output load, the controller 38 or data processor 32 attempts to find or lock-in one of the reference load curves (e.g., of $P_{Loss}$ versus $f_{PWM}$) based on observed or commanded ratio or percentage of output load for a corresponding time interval.

Then, the data processor 32 or controller 38 scans or sweeps PWM frequency for the frequency range of this curve until that data processor 32 or controller 38 identifies or determines a minimum loss point or minimum loss range on the load curve. For example, for 50% load curve, the controller 38 or data processor 32 will sweep PWM frequency to get to minimum loss point on the 50% load curve, which can be designated as $P_{Loss\_min\_50\%\ Load}$ operating point. Then converter or data processor 32 operates or continues to operate the primary converter 10 and the secondary converter 12 at a respective modulation frequency (e.g., PWM frequency) or range associated with the corresponding identified operating point that minimizes power loss, until the observed or commanded load (e.g., load percentage) is changed.

For examples, as load demand changes illustratively from 50% to 100%, system controller 38 will search for 100% load curve and then search or hunt for the $P_{Loss\_min\_100\%\ Load}$ operating point that minimizes power loss of the converter consistent with the applicable load curve. Accordingly, the converter or data processor 32 may update the modulation frequency associated with the corresponding new or next operating point that minimizes power loss for the converter (e.g., based on the applicable 100% load curve or next applicable load curve.)

In step S910, the electronic data processor 32 or electronic controller 38 generates modulation signals at a target frequency or target frequency range associated with a corresponding minimum or minimized total power loss in accordance with step S908.

In step S912, the electronic data processor 32 or electronic controller 38 estimates the inductor saturation current ($i_{Lsat}$) and generates switching functions that control setting or adjustment of an inductance value of the variable inductor. For example, the electronic data processor 32 or electronic controller 38 estimates the inductor saturation current required in a primary winding and variable inductance in series with the primary winding, and a set of switches can create a parallel or series network of switched inductances that can be inserted or removed from the variable inductor to adjust, establish or set its corresponding inductance value, dynamically or regularly over time intervals.

The proposed control method and converter is well suited to minimize energy losses and improve system efficiency of a DC-to-DC converter, such as single-phase, dual-active-bridge (SP DAB) DC-to-DC converter. The control method and converter tends to promote reduced cooling requirements of the active and passive components used in the DC-to-DC converter. The control method and converter tends to realize the maximum possible system efficiency under conditions when output load varies from various load percentages (e.g., 10% to 100%).

For example, the method and converter may facilitate reduction in size or required maximum inductance of the series inductor, $L_{ser}$, and the transformer by selecting or establishing modulation frequencies of the primary converter 10 and the secondary converter 12 that are consistent with operational points on the load curve data that minimize thermal loss within the primary converter 10, the secondary converter 12, or both.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The following is claimed:

1. A method of controlling a direct-current-to-direct-current converter wherein a primary converter is coupled to a secondary converter via a transformer, the method comprising:
determining a maximum power transfer from the primary converter to the secondary converter;
estimating an observed power transfer from the primary converter to the secondary converter;
determining an operational load ratio or operational load percentage between the observed power transfer and maximum power transfer;
selecting a load curve based on the determined operational load ratio or percentage; and
adjusting or maintaining the modulation frequency of the primary converter and the secondary converter consistent with an operation point on the selected load curve, where the operation point minimizes the power loss, power difference, or thermal energy dissipated from the direct-current-to-direct current converter.

2. The method according to claim 1 wherein the determining of the maximum power transfer from the primary converter to the secondary converter is based on or proportional to an input voltage to the primary converter, an output voltage of the secondary converter, a modulation frequency of the primary converter and the secondary converter, and primary inductance in series with a primary winding of the transformer.

3. The method according to claim 1 wherein the determining of the maximum power transfer from the primary converter to the secondary converter is determined in accordance with the following equation:

$$P_{max} = \frac{nV_{in}V_{out}}{Kf_{PWM}L_{ser}}$$

where $P_{max}$ is the maximum power transfer; n is transformer turn ratio; $V_{in}$ is input DC voltage to the primary converter at the DC primary terminals; $V_{out}$ is the output DC voltage of the secondary converter associated with DC secondary terminals; $f_{PWM}$ is the modulation frequency or switching frequency of the switches; K is a constant, and L is the transformer inductance modeled as a model inductance in series with a primary winding of the transformer.

4. The method according to claim 1 wherein the estimating of the observed power transfer from the primary converter to the secondary converter is based on or proportional to an observed input voltage to the primary converter, an observed output voltage of the secondary converter, a modulation frequency of the primary converter and the secondary converter, and a primary inductance in series with a primary winding of the transformer.

5. The method according to claim 1 wherein the estimating of the observed power transfer from the primary converter to the secondary converter is determined in accordance with the following equation:

$$P_{observed} = \frac{nV_{in\text{-}observed}V_{out\text{-}observed}}{Kf_{PWM}L_{ser}}$$

where $P_{observed}$ is the observed power transfer, n is transformer turn ratio, $V_{in\text{-}observed}$ is a measured or observed input DC voltage to the primary converter at the DC primary terminals; $V_{out\text{-}observed}$ is a measured or observed output DC voltage of the secondary converter associated with DC secondary terminals; $f_{PWM}$ is the modulation frequency or switching frequency of the switches; K is a constant, and L is the transformer inductance modeled as a model inductance in series with a primary winding of the transformer.

6. The method according to claim 1 wherein the load curve is selected from a set of load curves stored in a look-up table, each of the load curves associated with a corresponding ratio or percentage between the observed power transfer and maximum power transfer.

7. The method according to claim 1 wherein power difference is estimated as a function of DC input voltage of the converter, DC output voltage of the converter, DC input current of the converter, and DC output current of the converter.

8. The method according to claim 1 wherein the power difference is estimated in accordance with the following equation:

$$P_{diff}=(V_{in} \times i_{in})-(V_{out} \times i_L),$$

where $V_{in}$ is observed or design-specified DC input voltage of the converter; $V_{out}$ is observed or design-specified DC output voltage of the converter; $i_n$, is observed DC input current of the converter, and $I_L$ is observed DC output current of the converter.

9. The method according to claim 1 wherein power loss is estimated as a function of first power loss of the primary converter, a second power loss of secondary converter, and a third power loss of the transformer and an associated variable inductor in series with a primary winding of the transformer.

10. The method according to claim 1 wherein the power loss is estimated in accordance with the following equation:

$$P_{Loss}=L_{PC}+L_{SC}+L_M,$$

where $L_{PC}$ is power loss associated with the primary converter, $L_{SC}$ is power loss associated with the secondary converter, and $L_M$ is power loss associated with the magnetic circuit.

11. A system of controlling a direct current to direct current converter, the system comprising:
a primary converter comprising first pair of primary switches and a second pair of primary switches coupled between direct current input terminals of the primary converter;
a secondary converter comprising a first pair of secondary switches and second pair of secondary switches coupled between direct current output terminals of the secondary converter;
a transformer coupled between the primary converter and the secondary converter, a primary winding of the transformer coupled to output terminals of the first pair and second pair of primary switches, a secondary winding of the transformer coupled to output terminals of the secondary switches;
a load for coupling to the direct current output terminals;
wherein an electronic controller is configured to provide time-synchronized control signals to the control terminals of the primary switches and secondary switches to control the converter to operate at a modulation frequency;
a voltage measurement device for measuring an observed input voltage and observed output voltage to determine an operational load ratio or operational load percentage between the observed power transfer and maximum power transfer;
an electronic controller configured to select a load curve based on the determined operational load ratio or percentage; and
the electronic controller configured to adjust or maintain the modulation frequency of the primary converter and the secondary converter consistent with an operation point on the selected load curve, where the operation point minimizes the power loss, power difference, or thermal energy dissipated from the direct-current-to-direct current converter.

12. The system according to claim 11 wherein the determining of the maximum power transfer from the primary converter to the secondary converter is based on or proportional to an input voltage to the primary converter, an output voltage of the secondary converter, a modulation frequency of the primary converter and the secondary converter, and primary inductance in series with a primary winding of the transformer.

13. The system according to claim 11 wherein the determining of the maximum power transfer from the primary converter to the secondary converter is determined in accordance with the following equation:

$$P_{max}=\frac{nV_{in}V_{out}}{Kf_{PWM}L_{ser}}$$

where $P_{max}$ is the maximum power transfer; n transformer turn ratio; $V_{in}$ is input DC voltage to the primary converter at the DC primary terminals; $V_{out}$ is the output DC voltage of the secondary converter associated with DC secondary terminals; $f_{PWM}$ is the modulation frequency or switching frequency of the switches; K is a constant, and L is the transformer inductance modeled as a model inductance in series with a primary winding of the transformer.

14. The system according to claim 11 wherein the estimating of the observed power transfer from the primary converter to the secondary converter is based on or proportional to an observed input voltage to the primary converter, an observed output voltage of the secondary converter, a modulation frequency of the primary converter and the secondary converter, and a primary inductance in series with a primary winding of the transformer.

15. The system according to claim 11 wherein the estimating of the observed power transfer from the primary converter to the secondary converter is determined in accordance with the following equation:

$$P_{observed}=\frac{nV_{in-observed}V_{out-observed}}{Kf_{PWM}L_{ser}}$$

where $P_{observed}$ is the observed power transfer, n is transformer turn ratio, $V_{in-observed}$ is a measured or observed input DC voltage to the primary converter at the DC primary terminals; $V_{out-observed}$ is a measured or observed output DC voltage of the secondary converter associated with DC secondary terminals; $f_{PWM}$ is the modulation frequency or switching frequency of the switches; K is a constant, and L is the transformer inductance modeled as a model inductance in series with a primary winding of the transformer.

16. The system according to claim 11 wherein the load curve is selected from a set of load curves stored in a look-up table, each of the load curves associated with a corresponding ratio or percentage between the observed power transfer and maximum power transfer.

17. The system according to claim 11 wherein the power difference is estimated as a function of DC input voltage of the converter, DC output voltage of the converter, DC input current of the converter, and DC output current of the converter.

18. The system according to claim 11 wherein the power difference is estimated in accordance with the following equation:

$$P_{diff}=(V_{in} \times i_{in})-(V_{out} \times i_L),$$

where $V_{in}$ is observed or design-specified DC input voltage of the converter; $V_{out}$ is observed or design-specified DC output voltage of the converter; $i_{in}$ is observed DC input current of the converter, and $i_L$ is observed DC output current of the converter.

19. The system according to claim 1 wherein power loss is estimated as a function of first power loss of the primary converter, a second power loss of secondary converter, and a third power loss of the transformer and an associated variable inductor in series with a primary winding of the transformer.

20. The system according to claim 11 wherein the power loss is estimated in accordance with the following equation:

$$P_{Loss}=L_{PC}+L_{SC}+L_M,$$

where $L_{PC}$ is power loss associated with the primary converter, $L_{SC}$ is power loss associated with the secondary converter, and $L_M$ is power loss associated with the magnetic circuit.

* * * * *